US012750677B2

(12) United States Patent
Zhu et al.

(10) Patent No.: US 12,750,677 B2
(45) Date of Patent: Sep. 29, 2026

(54) WIRELESS COMMUNICATION METHOD AND APPARATUS

(71) Applicant: HUAWEI TECHNOLOGIES CO., LTD., Shenzhen (CN)

(72) Inventors: Jintao Zhu, Xi'an (CN); Fei Li, Boulogne Billancourt (FR); Kai Zhou, Shenzhen (CN); Hui Ding, Xi'an (CN)

(73) Assignee: Huawei Technologies Co., Ltd., Shenzhen (CN)

( * ) Notice: Subject to any disclaimer, the term of this patent is extended or adjusted under 35 U.S.C. 154(b) by 77 days.

(21) Appl. No.: 18/424,458

(22) Filed: Jan. 26, 2024

(65) Prior Publication Data

US 2024/0163670 A1 May 16, 2024

Related U.S. Application Data

(63) Continuation of application No. PCT/CN2022/106284, filed on Jul. 18, 2022.

(30) Foreign Application Priority Data

Jul. 30, 2021 (CN) ......................... 202110870734.5

(51) Int. Cl.

*H04W 12/69* (2021.01)
*H04L 9/30* (2006.01)
*H04W 12/069* (2021.01)

(52) U.S. Cl.

CPC ............... *H04W 12/69* (2021.01); *H04L 9/30* (2013.01); *H04W 12/069* (2021.01)

(58) Field of Classification Search

CPC ..................................................... H04W 12/69

See application file for complete search history.

(56) References Cited

U.S. PATENT DOCUMENTS 10,437,577 B2 * 10/2019 Balar .................... H04L 67/563
2002/0199104 A1 * 12/2002 Kakemizu ............... H04L 63/08 713/168

(Continued)

FOREIGN PATENT DOCUMENTS

CN 105577501 A 5/2016
CN 108616612 A 10/2018

(Continued)

OTHER PUBLICATIONS

"3rd Generation Partnership Project; Technical Specification Group Services and System Aspects; System architecture for the 5G System (5GS); Stage 2 (Release 17)," 3GPP TS 23.501 V17.0.0, total 482 pages, 3rd Generation Partnership Project, Valbonne, France (Mar. 2021).

*Primary Examiner* — Bradley W Holder

(74) *Attorney, Agent, or Firm* — Leydig, Voit & Mayer, Ltd.

(57) ABSTRACT

A wireless communication method and apparatus are provided. The method includes: a first device obtains first information, which includes a correspondence between first customer premise equipment and at least one first terminal device, and a correspondence between the first terminal device and at least one second terminal device. The first device configures the first information on a second device, which uses the first information to verify that a received service packet is a service packet sent by the first terminal device to the second terminal device by using the first customer premise equipment. Therefore, accuracy of service packet transmission of an industrial terminal device can be ensured, an industrial terminal or customer premise equipment can be prevented from being attacked to some extent, a loss caused by the attack on the device is reduced, and (Continued)

information security of the industrial terminal device and an entire industrial field network is improved.

20 Claims, 6 Drawing Sheets

(56) References Cited

U.S. PATENT DOCUMENTS

| | | | | |
|---|---|---|---|---|
| 2007/0058789 | A1* | 3/2007 | Lim | H04L 65/1095 379/88.17 |
| 2020/0260284 | A1 | 8/2020 | Salkintzis et al. | |
| 2020/0267513 | A1* | 8/2020 | Zhu | H04N 21/6131 |
| 2020/0287726 | A1 | 9/2020 | Garnier et al. | |
| 2020/0359218 | A1 | 11/2020 | Lee et al. | |

FOREIGN PATENT DOCUMENTS

| | | | |
|---|---|---|---|
| CN | 110582085 | A | 12/2019 |
| EP | 3618477 | A1 | 3/2020 |

* cited by examiner

WIRELESS COMMUNICATION METHOD AND APPARATUS

CROSS-REFERENCE TO RELATED APPLICATIONS

This application is a continuation of International Application No. PCT/CN2022/106284, filed on Jul. 18, 2022, which claims priority to Chinese Patent Application No. 202110870734.5, filed on Jul. 30, 2021. The disclosures of the aforementioned applications are hereby incorporated by reference in their entireties.

TECHNICAL FIELD

Embodiments of this application relate to the communication field, and in particular, to a wireless communication method and apparatus.

BACKGROUND

With the development of a 5th-generation (5G) industrial internet technology, especially the rapid development of in-depth integration of informatization and industrialization, an increasing number of industrial control system products are connected to public networks, such as the internet, by using general-purpose protocols, general-purpose hardware, and general-purpose software in various manners. In particular, a 5G local area network may provide wireless data access and a high-quality information transmission service that complies with industry standards for an industrial device in an industrial automatic control system (IACS). For example, an industrial terminal device in an industrial field network implements wireless network access by using customer premise equipment (CPE).

An industrial field network service has high requirements on real-time information transmission and network information security. However, an industrial field network based on a 5G wireless communication system has complex application environments, and has many network communication modes and distributed devices. There is a possibility of attacks. An open network environment, an industrial terminal with limited security mechanisms, and message transmission pose many information security risks to industrial field networks.

How to ensure secure transmission of a service packet of the industrial terminal device in the industrial field network becomes an urgent problem to be resolved in the industry.

SUMMARY

This application provides a wireless communication method and apparatus, to ensure secure transmission of a service packet of an industrial terminal in an industrial field network.

According to a first aspect, a wireless communication method is provided, including: A first device obtains first information, where the first information includes a correspondence between first customer premise equipment and at least one first terminal device, and a correspondence between the first terminal device and at least one second terminal device. The first device configures the first information on a second device, where the first information is used by the second device to verify that a received service packet is a service packet sent by the first terminal device to the second terminal device by using the first customer premise equipment.

According to the wireless communication method provided in this application, the first device obtains the correspondence between the first customer premise equipment and the at least one first terminal device, and the correspondence between the first terminal device and the at least one second terminal device, and configures the correspondences for the second device. The second device verifies that a terminal device corresponding to a source address of the received service packet is a terminal device corresponding to the first customer premise equipment, and terminal devices corresponding to the source address and a destination address respectively correspond to a control end terminal device and an execution end terminal device, to authorize forwarding the service packet. Therefore, accuracy of service packet transmission of an industrial terminal device can be ensured, an industrial terminal or customer premise equipment can be prevented from being attacked to some extent, a loss caused by an attack on the device is reduced, and information security of an industrial terminal device in an industrial field network is improved.

With reference to the first aspect, in some implementations of the first aspect, the method further includes: The first device generates a token of the first customer premise equipment based on the first information, and signs the token. The first device sends the token to the second device.

According to the technical solution, the first device configures the first information for the second device in a form of a token, and signs the token, to ensure that the second device may determine validity of the token after receiving the token. The validity may be understood as integrity and accuracy of content of the token, or may be understood as security of the token. In this way, security of the service packet is subsequently verified by using the token.

With reference to the first aspect, in some implementations of the first aspect, the method further includes: The first device generates a configuration message of the first customer premise equipment based on the first information. The first device sends the configuration message to the second device.

According to the technical solution, the first device may directly configure a packet message for the second device, which increases flexibility of processing the first information by the first device. The configuration message may be directly verified and used by the second device. It should be understood that, in this case, the first device and the second device are in a same security domain, and a secure channel is established between the first device and the second device. Therefore, the configuration message may be directly used to verify the packet, and security of the configuration message does not need to be additionally verified, thereby reducing signaling and improving efficiency.

With reference to the first aspect, in some implementations of the first aspect, the method further includes: The first information further includes a security certificate of the first terminal device, the security certificate is used by the second device to verify an identifier signature of the first terminal device based on a public key of the first terminal device, and the security certificate is delivered or pre-configured by the first device.

According to the technical solution, the first terminal device has a security capability, and verifies the identifier signature of the first terminal device based on the public key of the first terminal device included in the security certificate of the first terminal device, to ensure validity of the first terminal device and prevent the first terminal device from being attacked, thereby ensuring security of the service packet transmitted by the first terminal device.

In a possible implementation, the security certificate is delivered by the IFES, or is pre-configured.

With reference to the first aspect, in some implementations of the first aspect, the method further includes: That the first device configures the first information on a second device includes: The first device sends the first information to the second device by using a user plane function UPF network element. According to the technical solution, the first device may include the first information in a user plane, and a carrying manner may be flexibly selected when the first information is configured.

With reference to the first aspect, in some implementations of the first aspect, the method further includes: The first device sends the first information to a network exposure function NEF network element, so that the NEF network element sends a configuration request message to the second device by using a unified data management UDM network element. The configuration request message is used to request the second device to configure the first information, and the configuration request message includes a subscription permanent identifier of the second device.

Alternatively, the first device sends a policy request message to a policy control function PCF network element, where the policy request message includes the first information, and the policy request message is used by the PCF network element to send a packet detection rule PDR and a QoS enforcement rule QER to a UPF network element by using a session management function SMF network element.

According to the technical solution, the first device may include the first information in a control plane, and a carrying manner may be flexibly selected when the first information is configured.

With reference to the first aspect, in some implementations of the first aspect, the method further includes: The first information further includes that the first terminal device is a control end device and/or the second terminal device is an execution end device.

According to this technical solution, the first information includes role information of the terminal device, so that the second device further determines, when verifying the service packet, whether a role of the first terminal device matches a role of the second terminal device, thereby ensuring validity of packet information.

With reference to the first aspect, in some implementations of the first aspect, the method further includes: The first device is an AF, the second device is one of the UPF, the first customer premise equipment, or second customer premise equipment, and the second customer premise equipment is customer premise equipment corresponding to the at least one second terminal device.

According to a second aspect, a wireless communication method is provided, including: A second device obtains first information, where the first information includes a correspondence between first customer premise equipment and at least one first terminal device, and a correspondence between the first terminal device and at least one second terminal device. The second device verifies, based on the first information, that a received service packet is a service packet sent by the first terminal device to the second terminal device by using the first customer premise equipment. The second device sends the service packet to second customer premise equipment.

According to the wireless communication method provided in this application, the second device obtains the correspondence between the first customer premise equipment and the at least one first terminal device, and the correspondence between the first terminal device and the at least one second terminal device. The second device verifies that a terminal device corresponding to a source address of a received service packet is a terminal device corresponding to the first customer premise equipment, and terminal devices corresponding to the source address and a destination address respectively correspond to a control end terminal device and an execution end terminal device, to authorize forwarding the service packet. Therefore, accuracy of service packet transmission of an industrial terminal device can be ensured, an industrial terminal or customer premise equipment can be prevented from being attacked to some extent, a loss caused by an attack on the device is reduced, and information security of an industrial terminal device in an industrial field network is improved.

With reference to the second aspect, in some implementations of the second aspect, the method further includes: The second device receives a token, and determines, with reference to a signature of the token, that the token is a token corresponding to the first customer premise equipment. The token is generated by a first device for the first customer premise equipment based on the first information.

According to the technical solution, the second device may determine validity of the token. In this way, security of the service packet is subsequently verified by using the token.

With reference to the second aspect, in some implementations of the second aspect, the method further includes: The second device receives a configuration message, where the configuration message is generated by the first device for the first customer premise equipment based on the first information.

According to this technical solution, the second device may directly verify the service packet based on the configuration message. It should be understood that, in this case, the first device and the second device are in a same security domain, and a secure channel is established between the first device and the second device. Therefore, the configuration message may be directly used to verify the packet, and authenticity and security do not need to be verified, thereby saving signaling and improving efficiency.

With reference to the second aspect, in some implementations of the second aspect, the method further includes: The second device verifies, based on the correspondence between the first customer premise equipment and the at least one first terminal device in the first information, that a control end device corresponding to a source address of the service packet is one of first terminal devices corresponding to the first customer premise equipment. The second device verifies, based on the correspondence between the first terminal device and the at least one second terminal device in the first information, that the control end device and an execution end device that correspond to the source address and a destination address of the service packet are respectively one of the first terminal devices and one of the second terminal devices.

According to the technical solution, the second device may verify, based on the first information, that a sending end device in the service packet corresponds to the first customer premise equipment, and the sending end and a receiving end in the service packet respectively correspond to the first terminal device and the second terminal device, to verify that the sending end device of the service packet is a terminal device connected to the first customer premise equipment, and a communication path is a preset valid path.

In this way, validity of the first terminal device, validity of the communication path, and secure transmission of the service packet are ensured.

With reference to the second aspect, in some implementations of the second aspect, the method further includes: The second device verifies an identifier signature of the first customer premise equipment based on a pre-configured public key of the first customer premise equipment.

According to the technical solution, the second device may verify an identity of the first customer premise equipment, that is, ensure the security of the first customer premise equipment itself, and prevent the first customer premise equipment from being attacked.

With reference to the second aspect, in some implementations of the second aspect, the method further includes: The first information further includes a security certificate of the first terminal device. The method further includes: The second device verifies an identifier signature of the first terminal device based on a pre-configured public key of the first terminal device.

According to the technical solution, the first terminal device has a security capability, and verifies the identifier signature of the first terminal device based on the public key of the first terminal device included in the security certificate of the first terminal device, to ensure validity of the first terminal device and prevent the first terminal device from being attacked, thereby ensuring security of a service packet transmitted by the first terminal device.

With reference to the second aspect, in some implementations of the second aspect, the method further includes: The second device obtains and includes the first information in a user plane, or the second device obtains and carries the first information by using a control plane.

With reference to the second aspect, in some implementations of the second aspect, the method further includes: The first information further includes that the first terminal device is a control end device and/or the second terminal device is an execution end device.

According to this technical solution, the first information includes role information of the terminal device, so that the second device further determines, when verifying the service packet, whether a role of the first terminal device matches a role of the second terminal device, thereby ensuring validity of packet information.

With reference to the second aspect, in some implementations of the second aspect, the method further includes: The first device is an AF, the second device is one of a UPF, the first customer premise equipment, or the second customer premise equipment, and the second customer premise equipment is customer premise equipment corresponding to the at least one second terminal device.

According to a third aspect, a wireless communication apparatus is provided, and the wireless communication apparatus executes units of the method according to the first aspect or the implementations of the first aspect.

Based on the foregoing technical solution, the packet processing apparatus performs the method according to the first aspect or the implementations of the first aspect. Therefore, accuracy of service packet transmission of an industrial terminal device can be ensured, an industrial terminal or customer premise equipment can be prevented from being attacked to some extent, a loss caused by an attack on the device is reduced, and information security of an industrial terminal device in an industrial field network and an entire industrial field network is improved.

According to a fourth aspect, a wireless communication apparatus is provided, and the wireless communication apparatus executes units of the method according to the second aspect or the implementations of the second aspect.

Based on the foregoing technical solution, the wireless communication apparatus performs the method according to the second aspect or the implementations of the second aspect. Therefore, accuracy of service packet transmission of an industrial terminal device can be ensured, an industrial terminal or customer premise equipment can be prevented from being attacked to some extent, a loss caused by an attack on the device is reduced, and information security of an industrial terminal device in an industrial field network and an entire industrial field network is improved.

According to a fifth aspect, a wireless communication apparatus is provided, including a memory and a processor. The memory is configured to store computer instructions, and the processor is configured to execute the computer instructions stored in the memory, so that the wireless communication apparatus performs the wireless communication method according to the first aspect or the second aspect and the possible implementations of the first aspect or the second aspect.

Based on the foregoing technical solution, the wireless communication apparatus performs the method according to the foregoing implementations. Therefore, accuracy of service packet transmission of an industrial terminal device can be ensured, an industrial terminal or customer premise equipment can be prevented from being attacked to some extent, a loss caused by an attack on the device is reduced, and information security of an industrial terminal device in an industrial field network and an entire industrial field network is improved.

Optionally, there are one or more processors, and there are one or more memories.

Optionally, the memory may be integrated with the processor, or the memory and the processor are separately disposed.

According to a sixth aspect, a wireless communication apparatus is provided, including one of the foregoing first device and second device.

According to a seventh aspect, a computer-readable storage medium is provided. The computer-readable storage medium stores a computer program (which may also be referred to as code or instructions), and when the computer program is run on a computer, the computer is enabled to perform the method according to any one of the possible implementations of the first aspect and the second aspect.

According to an eighth aspect, a chip system is provided, including a processor and a memory, so that a communication apparatus installed with the chip system enabled to perform the method according to any one of the possible implementations of the first aspect and the second aspect.

DESCRIPTION OF EMBODIMENTS

The following describes technical solutions of this application with reference to accompanying drawings.

A wireless communication system mentioned in embodiments of this application includes but is not limited to a long term evolution (LTE) system, an LTE frequency division duplex (FDD) system, an LTE time division duplex (TDD) system, a universal mobile telecommunication system (UMTS), a worldwide interoperability for microwave access (WiMAX) communication system, a 5th-generation (5G) system, a future 6th-generation (6G), or a new radio (NR) system.

The following clearly and completely describes the technical solutions in embodiments of this application with reference to the accompanying drawings in embodiments of this application. It is clear that the described embodiments are some but not all of embodiments of this application. All other embodiments obtained by a person of ordinary skill in the art based on embodiments of this application without creative efforts shall fall within the protection scope of this application.

For ease of understanding embodiments of this application, a schematic diagram of an architecture of a wireless communication system 100 according to an embodiment of this application is first briefly described with reference to FIG. 1.

Figure 1:
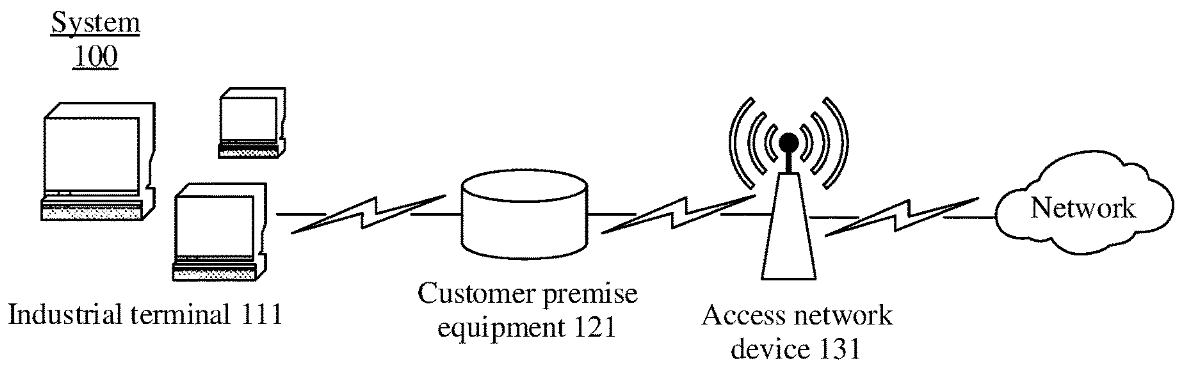
FIG. 1 is a schematic diagram of a structure of a wireless communication system applicable to an embodiment of this application.

The communication system 100 shown in FIG. 1 may be applied to an industrial scenario. The industrial scenario widely refers to industries such as industrial manufacturing, petrochemical, hydropower, and municipal construction, and particularly refers to a scenario involving discrete manufacturing or process manufacturing, for example, an industry involving a scenario such as a dock or a mine.

As shown in FIG. 1, the communication system 100 may include an industrial terminal device, for example, an industrial terminal 111 shown in FIG. 1. The industrial terminal device is a general term for devices that detect and control a production process and its electromechanical devices, process devices, and the like in an industrial field network. Common industrial terminal devices include an industrial control end terminal device and an industrial execution end terminal device, for example, a programmable logic controller (Programmable Logic Controller, PLC), an industrial input/output device, and a sensor. The communication system 100 may further include customer premise equipment, for example, customer premise equipment 121 shown in FIG. 1. The customer premise equipment (CPE) may be understood as a micro base station connected to an access network device by using a radio electromagnetic wave, and provides a wireless network access path for an industrial terminal device. Usually, in an industrial field network, one CPE may be connected to a plurality of industrial terminals, to provide network communication services for the plurality of industrial terminals. That is, the industrial terminal 111 is connected to the network by using the customer premise equipment 121. The communication system 100 may further include an access network device, for example, an access network device 131 shown in FIG. 1. The access network device 131 forwards a data packet of the customer premise equipment 121 to a data network by using a user plane function UPF network element. When a downlink data packet is transmitted, the access network device 131 forwards the data packet to the customer premise equipment 121, and then sends the data packet to the industrial terminal 111.

It should be understood that, in this embodiment of this application, the industrial terminal 111 may specifically include a plurality of industrial controllers and industrial devices. Real-time service communication is implemented between the industrial controllers and the industrial devices by using customer premise equipment and a network device. In addition, a communication path relationship between each industrial controller and each industrial device has been configured during configuration.

When user equipment 111 is located outside network coverage or a communication signal between the user equipment 111 and the access network device 121 is poor, the user equipment 111 may communicate with user equipment 112, and the user equipment 112 communicates with the access network device 121, so that the user equipment 111 can communicate with the access network device 121, and the access network device 121 forwards the data packet to the data network by using the UPF.

Figure 2:
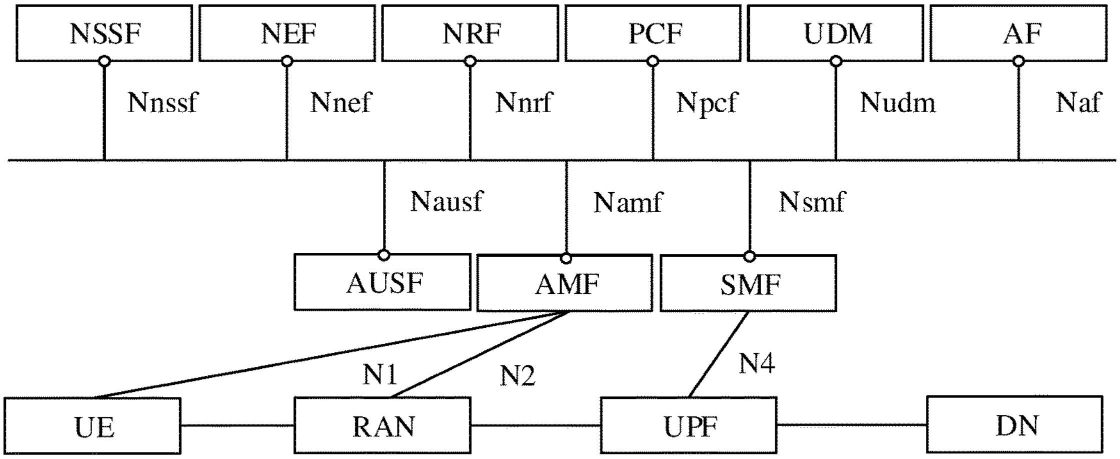
FIG. 2 is a schematic diagram of a network architecture of a wireless communication system applicable to an embodiment of this application.

FIG. 2 is a schematic diagram of a network architecture 200 of a communication system according to this application.

As shown in FIG. 2, a network architecture of the communication system includes but is not limited to the following network elements:

1. User equipment (UE): The terminal device in embodiments of this application may also be referred to as user equipment (UE), a mobile station (MS), a mobile terminal (MT), an access terminal, a user unit, a user station, a mobile base station, a mobile station, a remote station, a remote terminal, a mobile device, a user terminal, a terminal, a wireless communication device, a user agent, a user apparatus, or the like.

In embodiments of this application, the user equipment is, in particular, an industrial terminal device in an industrial scenario, for example, an industrial controller and an industrial device, for example, a programmable logic controller (PLC), a distributed control system (DCS), or a supervisory control and data acquisition (SCADA) system. The user equipment may be any device that can detect and control an electromechanical device, a process device, or the like in a production process. This is not limited in embodiments of this application.

In addition, in embodiments of this application, the user equipment may alternatively be user equipment in an internet of things (IoT) system. An IoT is an important part in future development of information technologies. A main technical feature of the IoT is to connect things to a network by using a communication technology, to implement an intelligent network for human-machine interconnection and thing-thing interconnection.

In embodiments of this application, the IoT technology may implement massive connections, in-depth coverage, and terminal power saving by using, for example, a narrow band NB technology. For example, an NB may include only one resource block (RB). In other words, a bandwidth of the NB is only 180 KB. To implement massive access, terminals need to be discrete in access. According to the communication method in embodiments of this application, a congestion problem that occurs in the IoT technology when massive terminals access a network through the NB may be effectively resolved.

In addition, an access device in embodiments of this application may be a device configured to communicate with user equipment, and the access device may also be referred to as an access network device or a radio access network device. For example, the access device may be an evolved NodeB (eNB or eNodeB) in an LTE system, or may be a radio controller in a cloud radio access network (CRAN) scenario, or may be a relay station, an access point, a vehicle-mounted device, a wearable device, an access device in a future 5G network, or an access device in a future evolved PLMN network, or may be an access point (AP) in a WLAN, or may be a gNB in a new radio (NR) system. This is not limited in embodiments of this application.

In addition, in embodiments of this application, the user equipment may further perform communication, for example, inter-device communication, with user equipment in another communication system. For example, the user equipment may further transmit (for example, send and/or receive) a time synchronization packet with user equipment in another communication system.

2. Access device (AN/RAN): The access device in embodiments of this application may be a device configured to communicate with user equipment, and the access device may also be referred to as an access network device or a radio access network device. For example, the access device may be an evolved NodeB (eNB or eNodeB) in an LTE system, or may be a radio controller in a cloud radio access network (CRAN) scenario, or may be a relay station, an access point, a vehicle-mounted device, a wearable device, an access device in a 5G network, or an access device in a future evolved PLMN network, or may be an access point (AP) in a WLAN, or may be a gNB in an NR system. This is not limited in embodiments of this application.

In addition, in embodiments of this application, the access device is a device in a RAN. In other words, the access device is a RAN node that enables the user equipment to access a wireless network. For example, by way of example and not limitation, the access device may be a gNB, a transmission reception point (TRP), an evolved NodeB (eNB), a radio network controller (RNC), a NodeB (NB), a base station controller (BSC), a base transceiver station (BTS), a home evolved NodeB (for example, a home evolved NodeB or a home NodeB, HNB), a baseband unit (BBU), or a wireless fidelity (Wi-Fi) access point (AP). In a network structure, the network device may include a central unit (CU) node, a distributed unit (DU) node, a RAN device including a CU node and a DU node, or a RAN device including a control plane CU node (CU-CP node), a user plane CU node (CU-UP node), and a DU node.

The access device serves a cell. The user equipment communicates with the access device on a transmission resource (for example, a frequency domain resource, or in other words, a frequency spectrum resource) used for the cell. The cell may be a cell corresponding to the access device (for example, a base station). The cell may belong to a macro base station, or a base station corresponding to a small cell. The small cell herein may include a metro cell, a micro cell, a pico cell, a femto cell, or the like. These small cells have features of small coverage and low transmit power, and are applicable to providing a high-speed data transmission service.

In addition, a plurality of cells may simultaneously operate in a same frequency band on a carrier in the LTE system or the 5G system. In some special scenarios, it may also be considered that a concept of the carrier is equivalent to that of the cell. For example, in a carrier aggregation (CA) scenario, both a carrier index of a secondary carrier and a cell identifier (cell identification, Cell ID) of a secondary cell that works on the secondary carrier are carried when the secondary carrier is configured for UE. In this case, it may be considered that the concept of the carrier is equivalent to that of the cell. For example, that the user equipment accesses a carrier is equivalent to that the user equipment accesses a cell.

3. Access and mobility management function (AMF) network element: The access and mobility management function network element is mainly used for mobility management, access management, and the like, and may be configured to implement another function other than session management in a mobility management entity (MME) function in an LTE system, for example, functions such as lawful interception and access authorization/authentication. When the AMF network element provides a service for a session in user equipment, the AMF network element provides a control plane storage resource for the session, to store a session identifier, an SMF network element identifier associated with the session identifier, and the like. In embodiments of this application, the AMF network element may be configured to implement functions of an access and mobility management network element.

4. Session management function (SMF) network element: The session management function network element is mainly used for session management, internet protocol (IP) address allocation and management of user equipment, selection and management of a user plane function, policy control, or an end point of a charging function interface, and downlink data notification. In embodiments of this application, the session management function network element may be used to implement a function of a session management network element.

5. Policy control (Policy Control Function, PCF) network element: The policy control network element is a unified policy framework used to guide network behavior, and provides policy rule information, a traffic-based charging control function, and the like for a control plane function network element (such as an AMF or an SMF network element).

6. Unified data management (UDM) network element: The unified data management network element is mainly responsible for processing subscription data of the UE, including storage and management of a user identifier, user subscription data, authentication data, and the like.

7. User plane function (UPF) network element: The user plane function network element is used for packet routing and forwarding, quality of service (QoS) processing of user plane data, or the like. User data may be accessed to a data network (DN) by using the network element, and the user data may further be received from the data network, and then transmitted to the user equipment by using an access network device. In the UPF network element, a transmission resource and a scheduling function that provide a service for the user equipment are managed and controlled by the SMF network element. In embodiments of this application, the user plane function network element may be configured to implement a function of a user plane network element.

8. Network exposure function NEF) network element: The network exposure function network element is configured to securely expose services, capabilities, and the like provided by a 3GPP network function to the outside, and mainly supports secure interaction between a 3GPP network and a third-party application.

9. Application function (AF) network element: The application function network element is configured to perform application-affected data routing, access a network exposure function network element, or interact with a policy framework to perform policy control, for example, affect data routing decision or a policy control function, or provide some third-party services for a network side.

10. Network slice selection function (NSSF) network element: The network slice selection function network element is mainly responsible for network slice selection, and determines, based on slice selection assistance information and subscription information of the UE, a network slice instance that the UE is allowed to access.

11. Authentication server function (AUSF) network element: The authentication server function network element supports 3GPP and non-3GPP access authentication.

12. Network repository function (NRF) network element: The network repository function network element supports registration and discovery of network functions.

13. Unified data repository (UDR) function network element: The unified data repository function network element stores and obtains subscription data used by the UDM and the PCF.

In the network architecture, an N2 interface is a reference point between a RAN and an AMF entity, and is used to send a NAS (Non-Access Stratum, non-access stratum) message and the like. An N3 interface is a reference point between the RAN and the UPF network element, and is used to transmit user plane data and the like. An N4 interface is a reference point between the SMF network element and the UPF network element, and is used to transmit information such as tunnel identifier information connected by N3, data buffer indication information, and a downlink data notification message.

It should be understood that the UE, the (R)AN, the UPF, and the DN in FIG. 2 are usually referred to as data plane network functions and entities. Data traffic of a user may be transmitted by using a PDU session established between the UE and the DN, and the transmission passes through two network function entities: the (R)AN and the UPF. Other parts are referred to as control plane network functions and entities, and are mainly responsible for functions such as authentication and authorization, registration management, session management, mobility management, and policy control, to implement reliable and stable transmission of user-layer traffic.

It should be understood that the foregoing network architecture applied to embodiments of this application is merely an example of a network architecture described from the perspective of a conventional point-to-point architecture and a service architecture, and a network architecture applicable to embodiments of this application is not limited thereto. Any network architecture that can implement functions of the foregoing network elements is applicable to embodiments of this application.

It should be understood that names of interfaces between the network elements in FIG. 2 are merely examples, and the interfaces may have other names during specific implementation. This is not specifically limited in this application. In addition, names of messages (or signaling) transmitted between the foregoing network elements are merely examples, and do not constitute any limitation on functions of the messages.

It should be noted that the "network element" may also be referred to as an entity, a device, an apparatus, a module, or the like. This is not particularly limited in this application. In addition, in this application, for ease of understanding and description, the description "network element" is omitted in some descriptions. For example, the SMF network element is referred to as an SMF for short. In this case, the "SMF" should be understood as an SMF network element or an SMF entity. Descriptions of same or similar cases are omitted below.

It may be understood that the entities or the functions may be network elements in a hardware device, may be software functions running on dedicated hardware, or may be virtualized functions instantiated on a platform (for example, a cloud platform).

Specific embodiments are used below to describe in detail the technical solutions of this application. The following several specific embodiments may be combined with each other, and a same or similar concept or process may not be described repeatedly in some embodiments.

Figure 3:
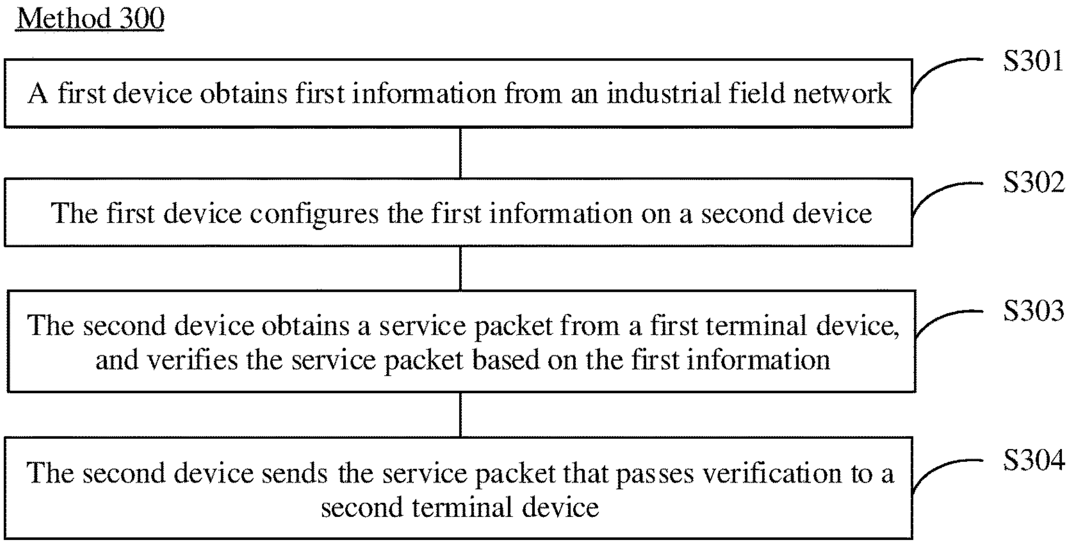
FIG. 3 is a schematic block diagram applicable to a wireless communication method according to an embodiment of this application.

FIG. 3 is a schematic block diagram of a wireless communication method according to an embodiment of this application. A method 300 may include the following steps:

S301: A first device obtains first information of an industrial field network.

Specifically, the first device obtains the first information of the industrial field network, where the first information may be configuration information, and the configuration information includes a binding relationship between first customer premise equipment CPE 1 and at least one first terminal device, and a communication relationship between the first terminal device and at least one second terminal device. The binding relationship may be understood as that one CPE may serve at least one industrial terminal device in a directional manner. For example, an industrial terminal device A and an industrial terminal device B are connected to the CPE 1, and both the industrial terminal device A and the industrial terminal device B may be connected to an access network device by using the CPE 1. The communication relationship refers to a direction of a communication path between industrial terminal devices. For example, data sent by an industrial terminal device C is received by an industrial terminal device D. The binding relationship and the communication relationship may alternatively be referred to as an association relationship, a correspondence, a correlation relationship, or the like. This is not limited in this embodiment of this application.

Optionally, the configuration information may further include a valid role of the industrial terminal device, that is, a preset functional role of the industrial terminal device, for example, whether the industrial terminal device is a controller (a sending end device) or an industrial device (a receiving end device).

It should be understood that the first device may be an AF device, for example, an industrial field enable service (IFES) device, or may be another device having a function of configuring configuration information. This is not limited in this embodiment of this application.

In a possible implementation, the first device may further configure a public key certificate of the first device on a second device. The public key certificate of the first device is used by the second device to verify security of the first information configured by the first device for the second device. For details, refer to the description in step S302.

S302: The first device configures the first information on the second device.

Specifically, the first device generates verification information based on the stored first information, and sends the verification information to the second device.

The verification information may be classified into two cases:

Case 1:

In this embodiment of this application, the verification information may be configured as a token form of the CPE 1, and the token may be understood as a token used by the CPE 1 to prove an identity and obtain a permission. The token specifically includes: an identifier of the CPE 1, for example, an IMSI, a GPSI, or an IMEI; a binding relationship between the CPE 1 and an industrial terminal device connected to the CPE 1, for example, CPE 1-C; and a communication relationship between the CPE 1 and the industrial terminal device connected to the CPE 1, for example, C-D. Optionally, the token may further include role type information of the industrial terminal device connected to the CPE 1. For example, C is a controller.

The first device may further perform digital signature on the token by using a private key of the first device, to ensure integrity and authenticity of the token. Specifically, it may be understood that the second device may verify validity of the signature by using a pre-configured IFES certificate. For example, content of the token is not tampered with by an attacker, to ensure authenticity of the token.

In this case, the first device configures the token to the CPE 1. The CPE 1 may use the token to verify an identity and permission of the CPE 1.

The second device may be the CPE 1, or may be CPE 2. The CPE 2 may be understood as customer premise equipment bound to a receiving end terminal industrial device.

Case 2:

In this embodiment of this application, the verification information may alternatively be a configuration message. The first device obtains, based on the configuration information, configuration information corresponding to the CPE 1 and directly organizes a configuration message. The configuration message includes a certificate of the CPE 1, the binding relationship between the CPE 1 and the industrial terminal device connected to the CPE 1, for example, CPE 1-C, and the communication relationship between the CPE 1 and the industrial terminal device connected to the CPE 1, for example, C-D. Optionally, the configuration message may further include the role type information of the industrial terminal device connected to the CPE 1. For example, C is a controller.

In this case, the first device may directly send the verification packet information to the second device for subsequent packet verification. It should be understood that the configuration message is sent in a form of a packet, not in a form of a token.

It should be understood that content of the verification information is the same as that of the first information, and the verification information is another form of the first information. The verification information may also be referred to as validation information, check information, or a similar description. This is not limited in this embodiment of this application.

The second device may be a UPF.

In a possible implementation, the first device may include the first information in a user plane, and send the first information to the second device.

In a possible implementation, the first device may alternatively include the first information in a control plane, and send the first information to the second device.

S303: The second device obtains the service packet from the first terminal device, and verifies the service packet based on the first information.

Specifically, the first terminal device sends the service packet to the second device, and the second device performs a verification operation based on specific verification information.

In this embodiment of this application, the second device may be CPE, or may be a UPF.

When the second device is a UPF, the second device obtains the service packet by using the CPE 1. The UPF verifies packets in two manners based on the verification information:

Manner 1:

The verification information is configured as a token. Specifically, after receiving the service packet from the first terminal device, the CPE 1 sends service packet information, identifier information of the CPE 1, and a pre-configured token to the UPF, and the UPF performs verification based on a received identifier of the CPE 1 and a token, to verify that the received service packet is a service packet sent by the first terminal device to a second terminal device by using the CPE 1. A verification procedure is as follows:

a: The UPF verifies validity of an identifier signature of the CPE 1 based on a public key of the CPE 1, to determine identity validity of the CPE 1. The validity refers to preset customer premise equipment of the CPE 1 in the industrial field network. It should be understood that, before the identifier of the CPE 1 is verified, a certificate of a pre-configured CPE 1 needs to be searched for in the UPF based on the identifier, to determine that the CPE 1 is a network device known to the UPF, and the certificate of the CPE 1 includes the public key of the CPE 1.

b: That the UPF verifies validity of the token based on the identifier of the CPE 1 specifically means that the token includes a sub field that corresponds to the identifier of the CPE 1, and the UPF may correspond to the identifier of the CPE 1 based on the sub field in the token, to determine that the token is a token corresponding to the CPE 1. It should be understood that before verifying validity of the token, the UPF first verifies validity of a token signature based on a configured IFES certificate, to ensure that content of the token is complete and correct. It should be understood that validity of the token means that the token is complete and accurate, and the token is a token corresponding to the CPE 1.

c: The UPF verifies, based on a binding relationship in the token, the industrial terminal device corresponding to a source address in the service packet, to determine that the industrial terminal device corresponding to the source address in the packet is a device connected to the CPE 1. Specifically, the UPF verifies, based on a correspondence between the first customer premise equipment and the at least one first terminal device in the token, that a sending end device corresponding to the source address of the service packet is one of the first terminal devices corresponding to the first customer premise equipment.

d: The UPF verifies, based on the communication relationship in the token, an industrial terminal device corresponding to a destination address in the service packet, to determine that the industrial terminal device corresponding to the destination address in the packet has a communication relationship with the industrial terminal device in step c. Specifically, the UPF verifies, based on a correspondence between the first terminal device and the at least one second terminal device in the token, that the sending end device and a receiving end device that are corresponding to the source address and the destination address of the service packet are respectively one of the first terminal devices and one of the second terminal devices, to determine that the communication relationship in the packet is authorized.

f: Optionally, whether the roles of the first terminal device and the second terminal device match may be further verified based on the valid role of the industrial terminal device in the token. The matching means that the first terminal device is a controller, and the second terminal device is an industrial device.

Manner 2:

The verification information is configured as a verification packet, and is directly sent to the UPF. Specifically, after receiving the service packet from the first terminal device, the CPE 1 sends the service packet information and the identifier information of the CPE 1 to the UPF, and the UPF performs verification based on the received identifier of the CPE 1 and the verification packet. It should be understood that the verification packet is basically the same as content of the token configured for the CPE 1, and specific verification steps are similar. Details are not described herein again.

When the second device is the CPE, in a possible implementation, the CPE 1 may verify the received service packet based on the identifier of the CPE 1 and the token.

Preferably, the CPE 1 may also send the service packet received from the first terminal device, the identifier of the CPE 1, and the token together to the CPE 2, and the CPE 2 performs verification based on the received identifier of the CPE 1 and the token. A specific verification step is similar to the foregoing, and details are not described herein again.

It should be noted that the binding relationship between the CPE 1 and the first terminal device still needs to be verified. However, in the complex industrial internet, the CPE 1 itself may be attacked. Therefore, the CPE 2 needs to determine, based on a received token, that the CPE 1 itself is valid, to further verify the binding relationship and the communication relationship.

S304: The second device sends the service packet that passes the verification to the second terminal device.

Specifically, the UPF forwards the service packet that passes the verification to the CPE 2, and the CPE 2 further forwards the service packet to the second terminal device.

In a possible implementation, the CPE 2 performs verification, and directly forwards the service packet that passes the verification to the second terminal device.

In this embodiment of this application, the first terminal device may be a controller in the industrial terminal device, and the second terminal device may be an industrial device in the industrial terminal device.

Figure 4:
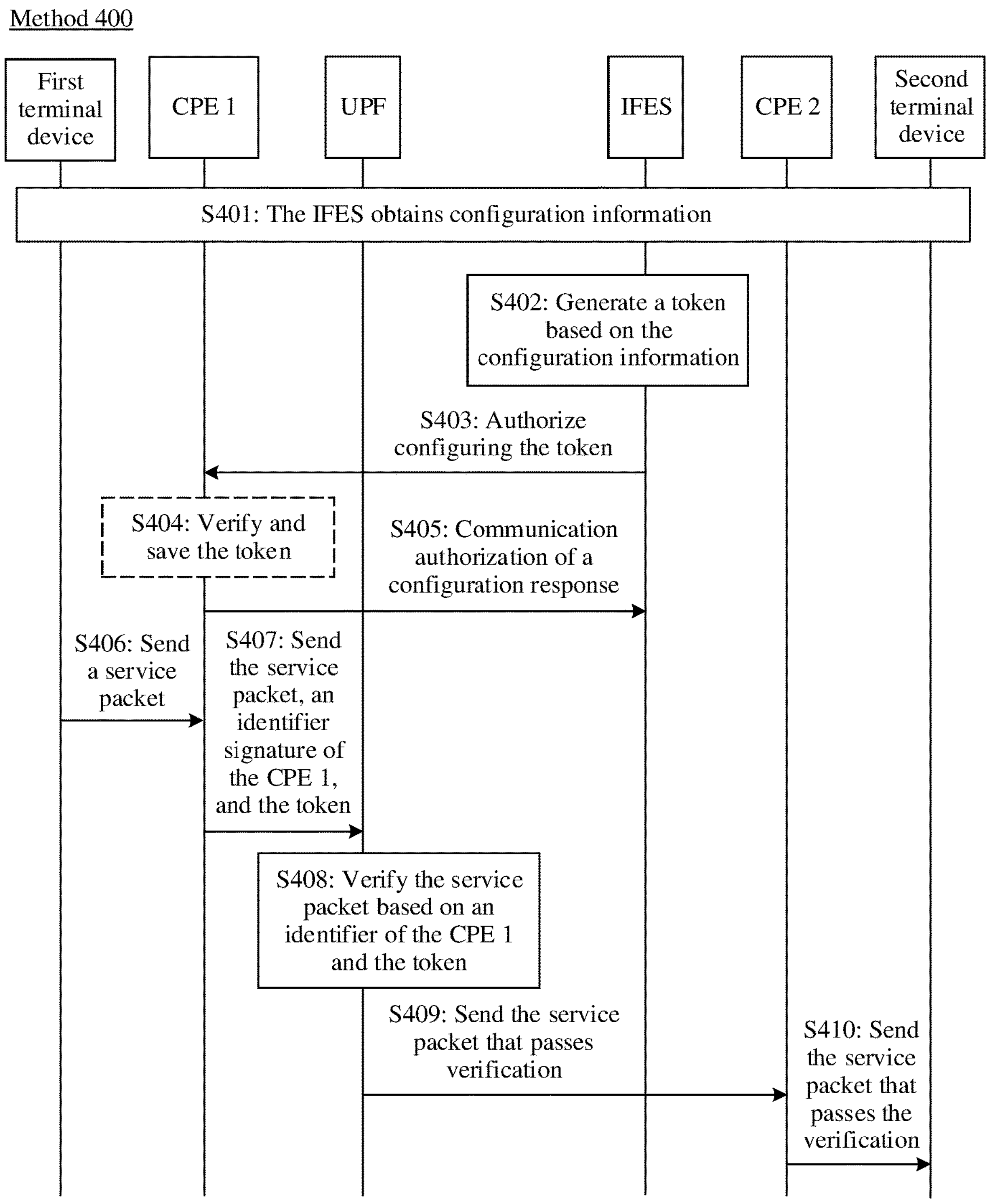
FIG. 4 is a schematic interaction diagram applicable to a wireless communication method according to an embodiment of this application.

FIG. 4 is a schematic interaction diagram of a wireless communication method according to an embodiment of this application. A method 400 in FIG. 4 corresponds to specific implementation steps of the method 300 in FIG. 3. The method shown in FIG. 4 may include steps S401 to S410. The following separately describes steps S401 to S410 in detail.

S401: An IFES obtains configuration information in an industrial field network, where the configuration information refers to information pre-configured or set in the industrial field network.

Specifically, a first correspondence between a first terminal device and CPE 1 and a second correspondence between the first terminal device and a second terminal device are included.

It should be understood that the first correspondence may include a correspondence between a plurality of terminal devices and the CPE 1, and the second correspondence may include a correspondence between the first terminal device and the plurality of terminal devices.

Optionally, the configuration information may further include role type information of the terminal device. For example, the first terminal device is a controller, or the second terminal device is an industrial device, or the first terminal device is a controller, and the second terminal device is an industrial device. It should be understood that the controller may also be referred to as a sending end device, and the industrial device may also be understood as a receiving end device. This is not limited in this embodiment of this application.

The IFES may further pre-configure an IFES certificate on a UPF, the CPE 1, and CPE 2, and pre-configure a certificate of the CPE 1 on the UPF.

S402: The IFES generates a token based on the configuration information.

Specifically, the IFES generates configuration information in a token form for the CPE 1 based on stored configuration information. That is, the IFES may configure the configuration information as a token form of the CPE 1.

The token specifically includes: the first correspondence between the CPE 1 and the first terminal device, the second correspondence between the first terminal device and the second terminal device, and the identifier of the CPE 1, for example, an IMSI or a GPSI. The first correspondence may be understood as that the first terminal device communicates with the network device by using the CPE 1, and the second correspondence may be understood as that there is a valid communication path between the first terminal device and the second terminal device. Optionally, the token may further include role type information of the industrial terminal device. For example, the first terminal device is a controller, and/or the second terminal device is an industrial device.

The IFES may further sign the token by using a private key, to verify integrity and authenticity of the token.

S403: The IFES authorizes the CPE 1 to configure the token.

Specifically, the IFES may include information about the token in a 5G user plane, to send the information about the token to the CPE 1.

In a possible implementation, the IFES may alternatively include the information about the token in a 5GC control plane. For a specific method, refer to FIG. 7.

S404: The CPE 1 verifies and saves the token.

Optionally, the CPE 1 may verify and store the token. Specifically, the IFES certificate is pre-configured on the CPE 1, and the token signature is verified based on the IFES certificate, to ensure that content of the token is complete and correct.

S405: The CPE 1 sends a configuration response message to the IFES.

S406: The CPE 1 receives a service packet.

Specifically, the service packet includes sending end address information and receiving end address information.

S407: The CPE 1 sends the service packet, the identifier of the CPE 1, and the token to the UPF.

S408: The UPF verifies the service packet based on the identifier of the CPE 1 and the token.

The verification procedure is as follows:

a: The UPF searches the UPF for a certificate of a pre-configured CPE 1 based on the identifier of the CPE 1, to determine that the CPE 1 is a network device known to the UPF.

b: The UPF verifies the identifier signature of the CPE 1 based on a public key of the CPE 1, to determine identity validity of the CPE 1. That is, the CPE 1 is the first customer premise equipment preset in the industrial field network.

c: The UPF verifies the signature of the token based on the pre-configured IFES certificate to determine correctness and integrity of the token.

d: The UPF verifies the identifier in step a based on the identifier of the CPE 1 in the token, to determine that the token is a token corresponding to the CPE 1.

e: The UPF verifies, based on the first correspondence between the CPE 1 and the first terminal device in the token, a terminal device corresponding to the source address in the service packet, and determines that the terminal device is the first terminal device. That is, the first terminal device has the first correspondence with the CPE 1.

f: The UPF verifies, based on the second correspondence between the first terminal device and the second terminal device in the token, terminal devices corresponding to the source address and the destination address in the service packet, and determines that the terminal device corresponding to the source address is the first terminal device and the terminal device corresponding to the destination address is the second terminal device. That is, that the communication relationship in the service packet complies with the communication path authorized in the token is verified.

g: Optionally, the UPF verifies, based on the valid role of the industrial terminal device in the token, that the first terminal device is a sending end device (controller), or verifies that the second terminal device is a receiving end device (industrial device).

S409: The UPF sends the service packet that passes the verification to the CPE 2.

S410: The CPE 2 forwards the service packet that passes the verification to the second terminal device.

According to the wireless communication method provided in this embodiment of this application, the IFES generates verification information in a token form for the first customer premise equipment based on an obtained correspondence between the first customer premise equipment and the sending end terminal device and an obtained correspondence between the sending end terminal device and the receiving end terminal device, and authorizes and configures the token to the first customer premise equipment. When receiving the service packet, the UPF verifies the service packet based on a first customer premise equipment identifier and the token, to ensure a valid identity of the first client and a valid identity of the token. In addition, the terminal device corresponding to the source address in the service packet is the terminal device corresponding to the first customer premise equipment, and the terminal device corresponding to the source address and the terminal device corresponding to the destination address respectively correspond to the sending end terminal device and the receiving end terminal device, thereby authorizing the forwarding of the service packet. Therefore, accuracy of service packet transmission of an industrial terminal device can be ensured, an industrial terminal or customer premise equipment can be prevented from being attacked to some extent, a loss caused by an attack on the device is reduced, and information security of an industrial terminal device in an industrial field network is improved.

Figure 5:
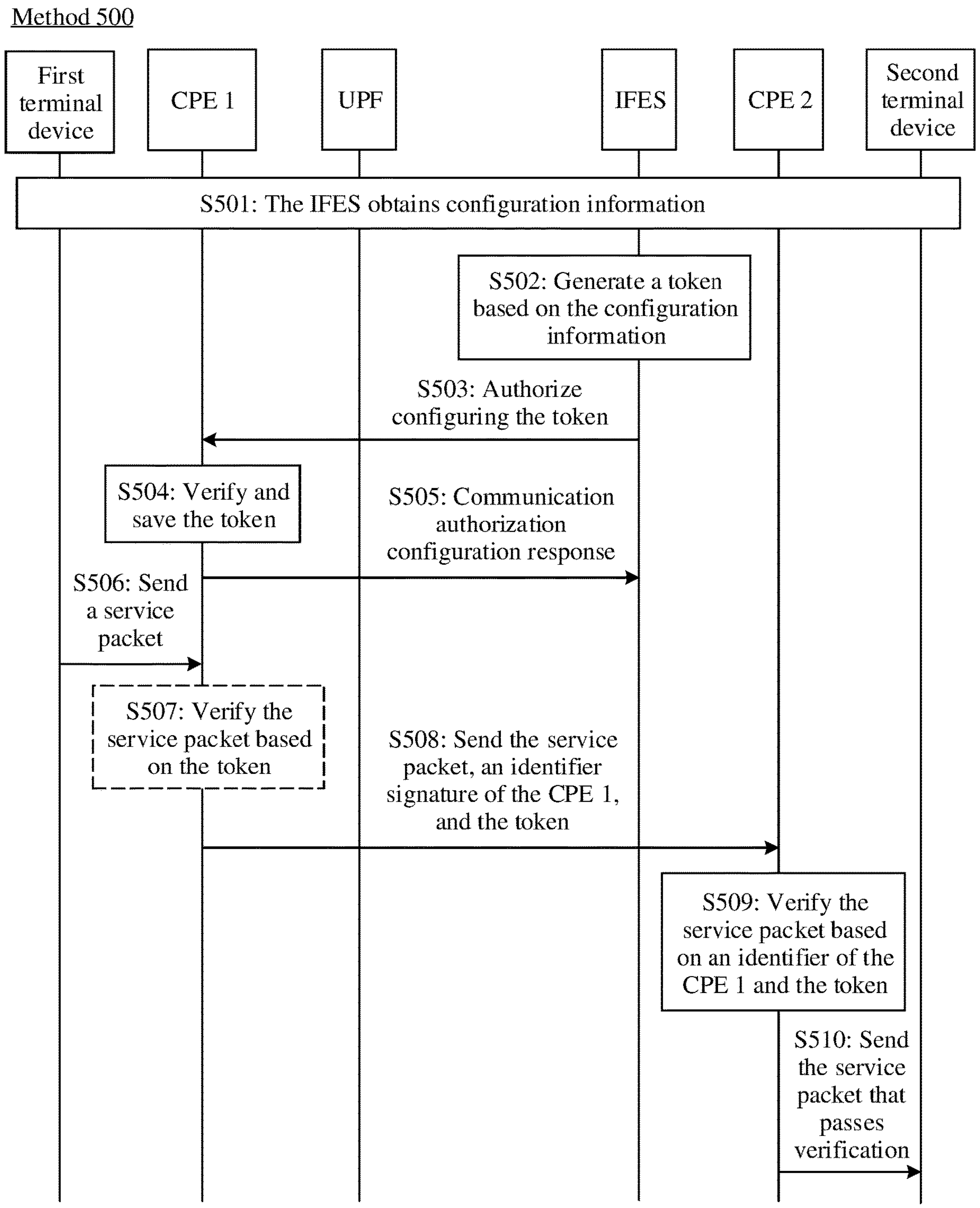
FIG. 5 is another schematic interaction diagram applicable to a wireless communication method according to an embodiment of this application.

FIG. 5 is another schematic interaction diagram of a wireless communication method according to an embodiment of this application. The method 500 in FIG. 5 corresponds to specific implementation steps of the method 300 in FIG. 3. The method shown in FIG. 5 may include steps S501 to S510. The following separately describes steps S501 to S510 in detail.

Steps S501 to S506 are similar to steps S401 to S406 in the method 400. Details are not described herein in this application.

S507: CPE 1 verifies a service packet based on a token.

Specifically, after receiving the service packet, the CPE 1 may verify content of the service packet based on a stored token, and verify, based on a first correspondence in the token, that a terminal device corresponding to a source address in the service packet is a terminal device corresponding to first customer premise equipment. The CPE 1 may verify, based on a second correspondence in the token, that the terminal devices corresponding to the source address and a destination address in the service packet are a first terminal device and a second terminal device respectively.

Optionally, the CPE 1 may alternatively verify, based on the token, that the first terminal device is a sending end device (controller), or verify that the second terminal device is a receiving end device (industrial device).

It should be understood that this step is an optional step. After the CPE 1 performs this step, if the content of the service packet does not pass the verification, a subsequent step does not need to be performed. If the CPE 1 does not perform this step, subsequent service packet verification may also be completely performed by CPE 2. Alternatively, the CPE 1 and the CPE 2 may perform verification at the same time, to improve verification accuracy.

S508: The CPE 1 sends the service packet, an identifier of the CPE 1, and the token to the CPE 2.

S509: The CPE 2 verifies the service packet based on the identifier of the CPE 1 and the token.

The verification procedure is as follows:

a: The CPE 2 searches the CPE 2 for a certificate of a pre-configured CPE 1 based on the identifier of the CPE 1, to determine that the CPE 1 is a network device known to the CPE 2.

b: The CPE 2 verifies an identifier signature of the CPE 1 based on a public key of the CPE 1, to determine identity validity of the CPE 1. That is, the CPE 1 is the first customer premise equipment preset in the industrial field network.

c: The CPE 2 verifies a signature of the token based on a pre-configured IFES certificate to determine correctness and integrity of the token.

d: The CPE 2 verifies the identifier in step a based on the identifier of the CPE 1 in the token, to determine that the token is a token corresponding to the CPE 1.

e: The CPE 2 verifies, based on the first correspondence between the CPE 1 and the first terminal device in the token, the terminal device corresponding to the source address in the service packet, and determines that the terminal device is the first terminal device. That is, the CPE 2 has the first correspondence with the CPE 1.

f: The CPE 2 verifies, based on the second correspondence between the first terminal device and the second terminal device in the token, the terminal devices corresponding to the source address and the destination address in the service packet, and determines that the terminal device corresponding to the source address is the first terminal device and the terminal device corresponding to the destination address is the second terminal device. That is, that the communication relationship in the service packet complies with the communication path authorized in the token is verified.

g: Optionally, the CPE 2 verifies, based on the valid role of the industrial terminal device in the token, that the first terminal device is a sending end device (controller), or verifies that the second terminal device is a receiving end device (industrial device).

It should be noted that the CPE 2 determines, based on the received token, that the CPE 1 is valid, and may further verify the service packet content only after the CPE 1 is excluded from being attacked.

S510: The CPE 2 sends the service packet to the second terminal device.

Based on this embodiment of this application, the IFES generates verification information in a token form for the first customer premise equipment based on an obtained correspondence between the first customer premise equipment and the sending end terminal device and an obtained correspondence between the sending end terminal device and the receiving end terminal device, and authorizes and configures the token to the first customer premise equipment. The first customer premise equipment forwards the token, the first customer premise equipment identifier, and the service packet to the second customer premise equipment, and the second customer premise equipment verifies the service packet based on the first customer premise equipment identifier and the token, to ensure a valid identity of the first customer premise and a valid identity of the token. In addition, the terminal device corresponding to the source address in the service packet is the terminal device corresponding to the first customer premise equipment, and the terminal device corresponding to the source address and the terminal device corresponding to the destination address respectively correspond to the sending end terminal device and the receiving end terminal device, thereby authorizing the forwarding of the service packet. Therefore, accuracy of service packet transmission of an industrial terminal device can be ensured, an industrial terminal or customer premise equipment can be prevented from being attacked to some extent, a loss caused by an attack on the device is reduced, and information security of an industrial terminal device in an industrial field network is improved.

Figure 6:
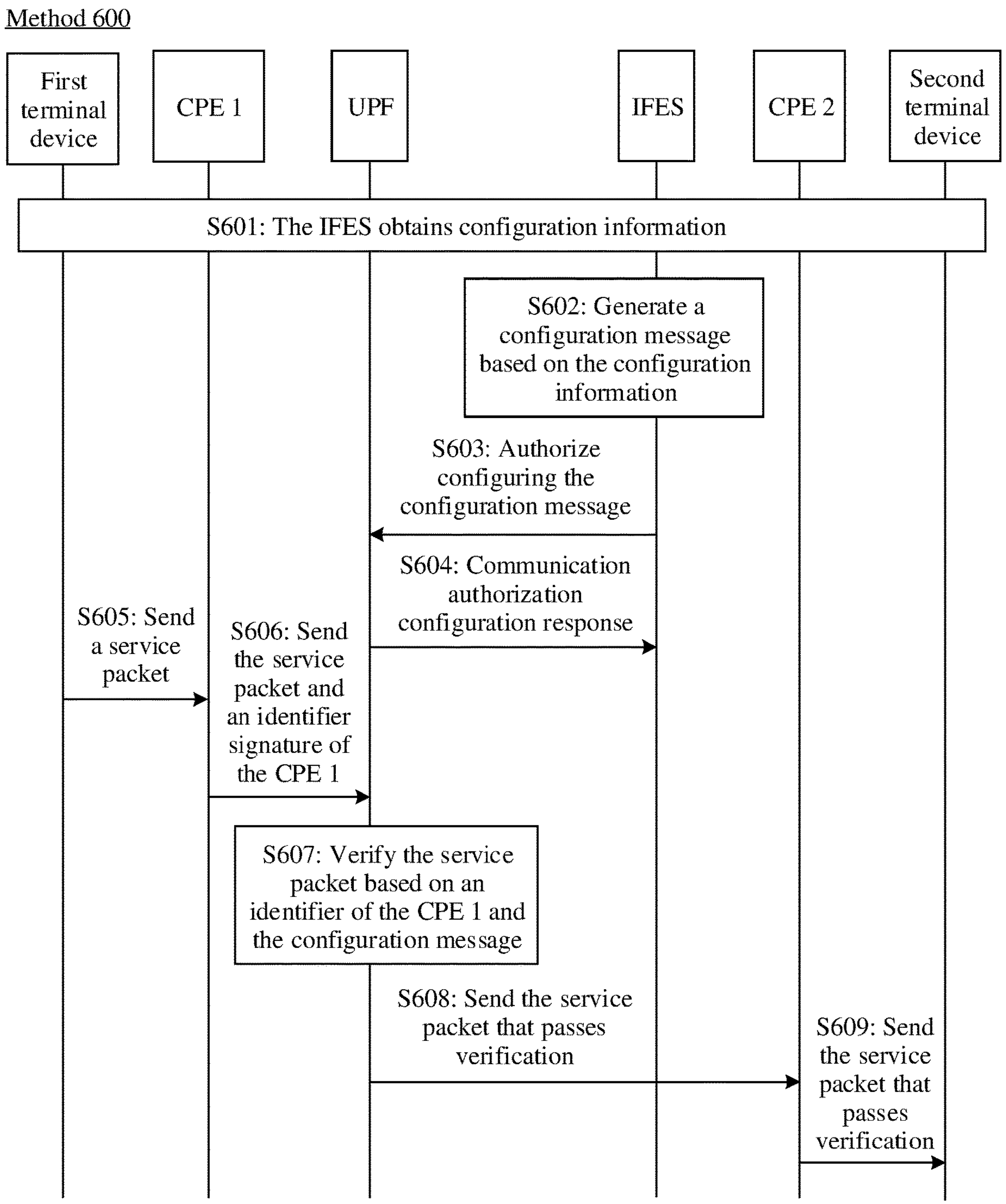
FIG. 6 is another schematic interaction diagram applicable to a wireless communication method according to an embodiment of this application.

FIG. 6 is another schematic interaction diagram of a wireless communication method according to an embodiment of this application. A method 600 in FIG. 6 corresponds to specific implementation steps of the method 300 in FIG. 3. The method shown in FIG. 6 may include steps S601 to S611. The following separately describes steps S601 to S611 in detail.

S601 is basically the same as step S401 in the method 400. To avoid repetition, no repeated description is provided.

S602: An IFES generates a configuration message based on configuration information.

Specifically, the IFES generates the configuration information in a configuration message form for CPE 1 based on saved configuration information. That is, the IFES may configure the configuration information as the configuration message of the CPE 1.

The configuration message specifically includes: a first correspondence between the CPE 1 and a first terminal device, a second correspondence between the first terminal device and a second terminal device, and an identifier of the CPE 1, for example, an IMSI or a GPSI. The first correspondence may be understood as that the first terminal device communicates with a network device by using the CPE 1, and the second correspondence may be understood as that there is a valid communication path between the first terminal device and the second terminal device. Optionally, the token may further include role type information of the industrial terminal device. For example, the first terminal device is a controller, and/or the second terminal device is an industrial device.

It should be understood that specific content of the configuration message is the same as specific content of the token, and is only in different information forms.

S603: The IFES authorizes the UPF to configure the token.

Specifically, the IFES may include the configuration message in the 5G user plane, to send the configuration message to the CPE 1.

In a possible implementation, the IFES may alternatively include the configuration message in the 5GC control plane. For a specific method, refer to FIG. 7.

S604: The UPF sends the configuration response message to the IFES.

S605: The CPE 1 receives a service packet.

Specifically, the service packet includes the sending end address and the receiving end address information.

S606: The CPE 1 sends the service packet, the identifier of the CPE 1, and the configuration message to the UPF.

S607: The UPF verifies the service packet based on the identifier of the CPE 1 and the configuration message.

A specific verification step is similar to step S408 in the method 400, and only the token identity does not need to be verified. Other steps are the same. Details are not described herein again.

S608: The UPF sends the service packet that passes the verification to the CPE 2.

S609: The CPE 2 forwards the service packet that passes the verification to the second terminal device.

According to the wireless communication method provided in this embodiment of this application, the IFES generates the verification information in a form of the configuration message for the first customer premise equipment based on the obtained correspondence between the first customer premise equipment and the sending end terminal device and the obtained correspondence between the sending end terminal device and the receiving end terminal device, and authorizes and configures the configuration message to the UPF. When receiving the service packet, the UPF verifies the service packet based on the first customer premise equipment identifier and the configuration message, to ensure the valid identity of the first client and to ensure that the terminal device corresponding to the source address in the service packet is the terminal device corresponding to the first customer premise equipment, and the terminal devices corresponding to the source address and the destination address respectively correspond to the sending end terminal device and the receiving end terminal device, thereby authorizing the forwarding of the service packet. In this solution, the configuration message is used to avoid a complex token verification process, the process is more flexible and simplified, and accuracy of service packet transmission of the industrial terminal device is ensured. To some extent, the industrial terminal or the customer premise equipment may be prevented from being attacked, the loss caused by attack on the device is reduced, and information security of the industrial terminal device in the industrial field network is improved.

Figure 7:
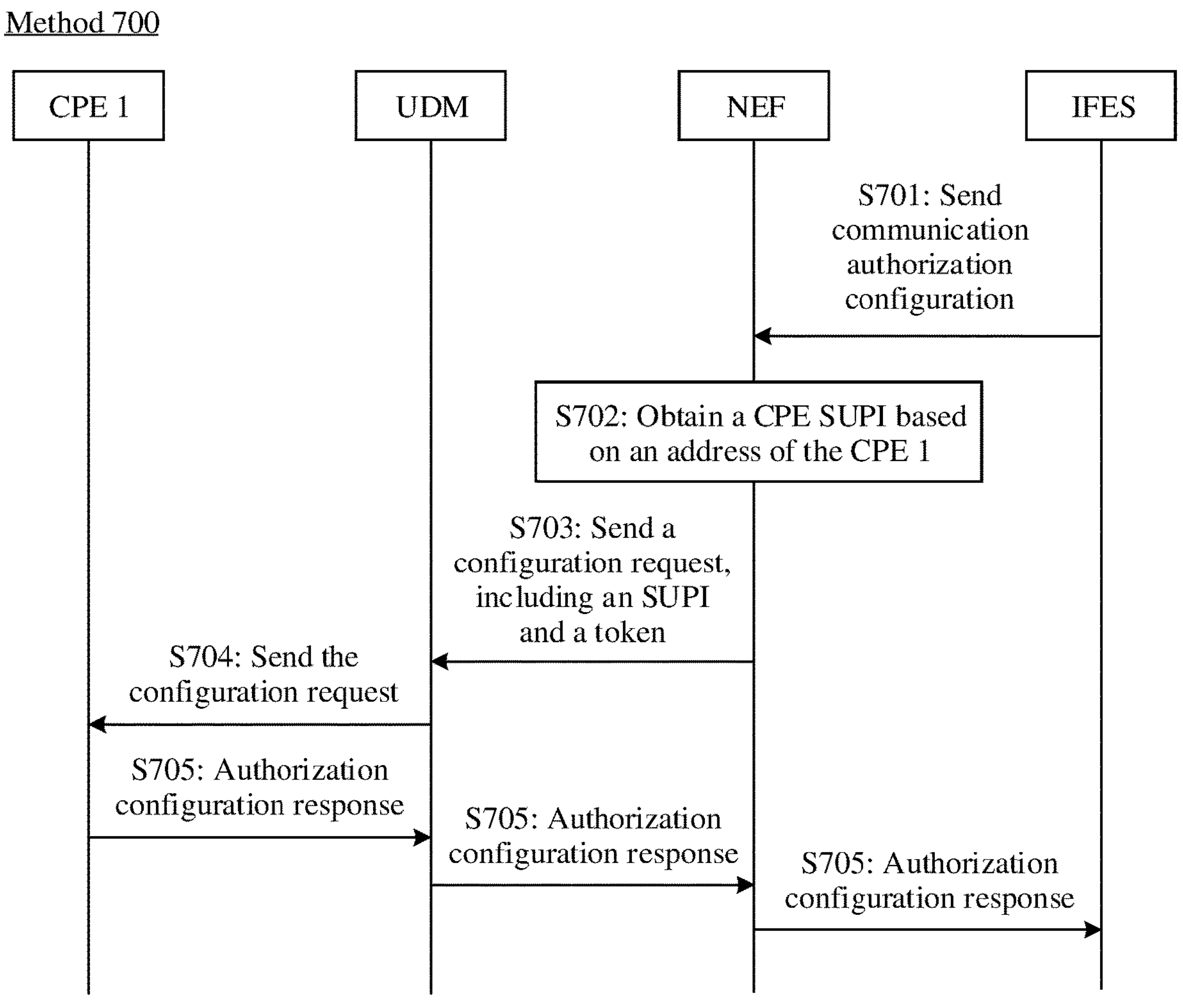
FIG. 7 is a schematic interaction diagram applicable to configuring first information by using a 5GC according to an embodiment of this application.

FIG. 7 is a schematic interaction diagram of configuring first information by using a 5GC according to an embodiment of this application. The method shown in FIG. 7 may include steps S701 to S706. The following separately describes steps S701 to S706 in detail.

The first information is configured in a token form.

S701: An IFES sends the token to an NEF.

S702: The NEF obtains a CPE subscription permanent identifier SUPI based on an address of CPE.

S703: The NEF sends configuration request information to a UDM, where the configuration request information includes the token and the CPE SUPI.

S704: The UDM sends the configuration request information to the CPE.

S705: The CPE sends a configuration response to the IFES by using the UDM and the NEF.

Figure 8:
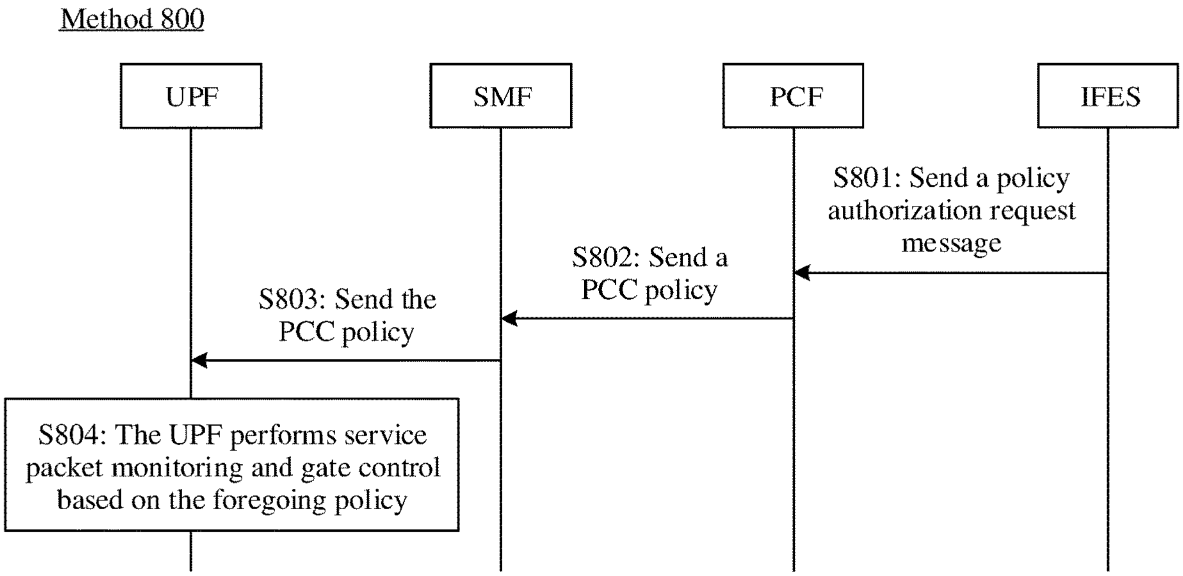
FIG. 8 is another schematic interaction diagram applicable to configuring first information by using a 5GC according to an embodiment of this application.

FIG. 8 is another schematic interaction diagram of configuring first information by using a 5GC according to an embodiment of this application. The method shown in FIG. 8 may include steps S801 to S805. The following separately describes the steps S801 to S805 in detail.

The first information is configured as the configuration message.

S801: The IFES directly or indirectly (through an NEF) sends a policy authorization request message to the PCF. The policy authorization request message includes address information of the first terminal device, service flows of the first terminal device and the second terminal device, and corresponding flow control information, that is, communication path information. The policy authorization request message is used by the PCF to indicate the SMF or the UPF to release the service flows. Optionally, the policy authorization request message further includes functional role information of the terminal device.

S802: The PCF generates a PCC policy based on the policy authorization request message and sends the PCC policy to the SMF. Service flow information and gate control information are used to generate a packet detection rule (PDR), and a QoS enforcement rule (QER). The SMF may further determine additional flow description information based on a mapping relationship between role information and a service flow characteristic. For example, the terminal device C serves as a controller, and a message sent by the terminal device C has the following characteristics: a-c. The SMF may perform extended description on the PDR based on the information.

S803: The SMF sends the PCC policy to the UPF.

S804: The UPF performs packet monitoring and gate control based on the PDR/QER. Optionally, the PDR may further include a flow characteristic of the role information corresponding to the controller C, and the UPF also needs to perform flow matching based on the characteristic information.

It should be understood that, in a specific implementation, identity authentication of the CPE 1 still needs to be performed based on the method in the method 400. Only the content of the service packet is checked. The UPF performs gate control policy on related service flows based on the PDR and the QER. Other steps are basically the same.

S805: The UPF sends the configuration response to the IFES by using the UDM and the NEF.

In this embodiment of this application, in this solution, it is considered that the industrial terminal device has a security capability after evolution. In other words, the industrial terminal device may support certificate signature, and sign the identifier of the industrial terminal device by using the private key of the industrial terminal device, to indicate the valid identity of the industrial terminal device.

The method 600 is used as an example. If the first terminal device has a security capability, the UPF may determine the valid identity of the first terminal device based on the security capability of the first terminal device.

Specifically, in S601, the IFES obtains the configuration information. The configuration information further includes the security certificate of the first terminal device. In S603, the IFES configures the configuration information on the UPF. That is, the security certificate of the first terminal device is configured on the UPF.

In S607, after the UPF receives the service packet and the identifier signature of the first terminal device from the first terminal device, the UPF searches, based on the received identifier, for a corresponding security certificate configured on the UPF, and verifies validity of the first terminal device identifier based on the public key included in the security certificate of the first terminal device, to determine authenticity of the first terminal device. A subsequent verification step is the same as step S607, and details are not described herein again.

According to the wireless communication method provided in this embodiment of this application, the IFE may configure, on a verification subject, a first correspondence between the first customer premise equipment and the sending end terminal device, and a second correspondence between the sending end terminal device and the receiving end terminal device. The verification subject may verify security of the CPE or the industrial terminal by using a public key signature identifier of the verification subject based on a certificate of a pre-configured CPE or industrial terminal certificate, and further verify security of the service packet based on the first correspondence and the second correspondence. Therefore, accuracy of service packet transmission of an industrial terminal device can be ensured, an industrial terminal or customer premise equipment can be prevented from being attacked to some extent, a loss caused by an attack on the device is reduced, and information security of an industrial terminal device in an industrial field network is improved.

Embodiments described in this specification may be independent solutions, or may be combined based on internal logic. All these solutions fall within the protection scope of this application.

It should be understood that the steps in the foregoing embodiments are merely possible implementations, and this is not limited in this embodiment of this application.

It may be understood that in the foregoing method embodiments, the methods and operations that are implemented by the user equipment may alternatively be implemented by a component (for example, a chip or a circuit) that may be used in the user equipment, and the methods and the operations that are implemented by the access network device (for example, a RAN node) may alternatively be implemented by a component (for example, a chip or a circuit) that may be used in the access network device.

The foregoing mainly describes the solutions provided in embodiments of this application from a perspective of interactions. It may be understood that, to implement the foregoing functions, each network element such as a sending end device or a receiving end device includes a corresponding hardware structure and/or software module for performing each function. A person skilled in the art may be aware that, with reference to the various example units and algorithm steps described in embodiments disclosed in this specification, this application may be implemented by hardware or a combination of computer software and hardware. Whether a function is performed by hardware or hardware driven by computer software depends on particular applications and design constraints of the technical solutions. A person skilled in the art may use different methods to implement the described functions for each particular application, but it should not be considered that the implementation goes beyond the scope of this application.

In embodiments of this application, functional modules of a sending end device or a receiving end device may be divided based on the foregoing method examples. For example, functional modules may be divided based on functions, or two or more functions may be integrated into one processing module. The integrated module may be implemented in a form of hardware, or may be implemented in a form of a software functional module. It should be noted that, in embodiments of this application, division of the modules is an example, and is merely logical function division. During actual implementation, another division manner may be used. Descriptions are provided below by using an example in which each functional module is obtained through division corresponding to each function.

The foregoing has described the methods provided in embodiments of this application in detail with reference to FIG. 3 to FIG. 8. The following describes apparatuses provided in embodiments of this application with reference to FIG. 6 and FIG. 7. It should be understood that descriptions of apparatus embodiments correspond to the descriptions of the method embodiment. Therefore, for content that is not described in detail, refer to the foregoing method embodiment. For brevity, details are not described herein again.

Figure 9:
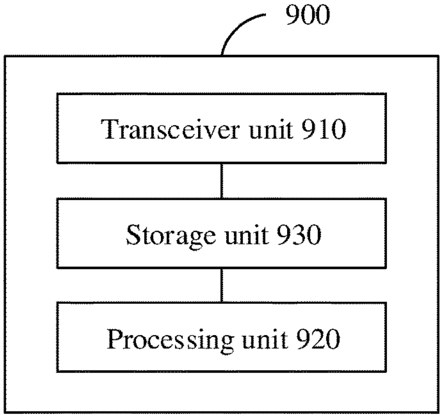
FIG. 9 is a schematic block diagram applicable to a wireless communication apparatus according to an embodiment of this application.

FIG. 9 is a schematic block diagram of a wireless communication apparatus according to an embodiment of this application. The wireless communication apparatus 900 includes a transceiver unit 910 and a processing unit 920. The transceiver unit 910 may implement a corresponding communication function, and the processing unit 920 is configured to perform data processing, so that the wireless communication apparatus is enabled to implement the foregoing method embodiments. The transceiver unit 910 may also be referred to as a communication interface or a communication unit.

Optionally, the wireless communication apparatus 900 may further include a storage unit 930. The storage unit may be configured to store instructions and/or data. The processing unit 920 may read the instructions and/or the data in the storage unit, so that the communication apparatus is enabled to implement the foregoing method embodiments.

The wireless communication apparatus 900 may be configured to perform an action performed by the first device in the foregoing method embodiment. In this case, the wireless communication apparatus 900 may be the first device or a component that may be configured for the first device. The transceiver unit 910 is configured to perform a receiving and sending related operation on the first device side in the foregoing method embodiments. The storage unit 930 is configured to perform a data or instruction storage related operation on the first device side in the foregoing method embodiments. The processing unit 920 is configured to perform a processing related operation on the first device side in the foregoing method embodiments. The first device may be an AF network element.

Alternatively, the wireless communication apparatus 900 may be configured to perform an action performed by the second device in the foregoing method embodiments. In this case, the wireless communication apparatus 900 may be the second device or a component that may be configured for the second device. The transceiver unit 910 is configured to perform a receiving and sending related operation on the second device side in the foregoing method embodiments. The storage unit 930 is configured to perform a data or instruction storage related operation on the second device side in the foregoing method embodiments. The processing unit 920 is configured to perform a processing related operation on the second device side in the foregoing method embodiments. The second device may be a UPF network element or customer premise equipment.

In a design, the wireless communication apparatus 900 is configured to perform an action performed by the first device in the embodiment shown in FIG. 4, and the transceiver unit 910 is configured to obtain first information. The first information includes a correspondence between first customer premise equipment and at least one first terminal device, and a correspondence between the first terminal device and at least one second terminal device. The processing unit 920 is configured to configure the first information on a second device, where the first information is used by the second device to verify that a received service packet is a service packet sent by the first terminal device to the second terminal device by using the first customer premise equipment.

The wireless communication apparatus 900 may implement steps or procedures performed by the first device (IFES) in the method 400 to the method 600 according to embodiments of this application. The wireless communication apparatus 900 may include units configured to perform the methods performed by the first device in the method 400 in FIG. 4 to the method 600 in FIG. 6. In addition, the units in the wireless communication apparatus 900 and the foregoing other operations and/or functions are respectively used to implement corresponding procedures of the method 400 in FIG. 4 to the method 600 in FIG. 6.

When the communication apparatus 900 is configured to perform the method 400 in FIG. 4, the transceiver unit 910 may be configured to perform step 401, step 403, and step 405 in the method 400, and the processing unit 920 may be configured to perform step 402 in the method 400.

The method 500 and the method 600 are similar to the method 400, and details are not described herein again.

It should be understood that a specific process in which the units perform the foregoing corresponding steps is described in detail in the foregoing method embodiments. For brevity, details are not described herein again.

In another design, the wireless communication apparatus 900 is configured to perform an action performed by the second device in the embodiment shown in FIG. 4. The transceiver unit 910 is configured to obtain first information, where the first information includes a correspondence between first customer premise equipment and at least one first terminal device, and a correspondence between the first terminal device and at least one second terminal device. The processing unit 920 is configured to verify, based on the first information, that a received service packet is a service packet sent by the first terminal device to the second terminal device by using the first customer premise equipment. The transceiver unit 910 is further configured to send the service packet to second customer premise equipment.

The wireless communication apparatus 900 may implement steps or procedures performed by the second device in the method 400 to the method 600 according to embodiments of this application. The wireless communication apparatus 900 may include units configured to perform the method performed by the second device in the method 400 in FIG. 4 and the method 600 in FIG. 6. In addition, the units in the wireless communication apparatus 900 and the foregoing other operations and/or functions are respectively used to implement corresponding procedures of the method 400 in FIG. 4 to the method 600 in FIG. 6.

When the communication apparatus 900 is configured to perform the method 400 in FIG. 4, the transceiver unit 910 may be configured to perform step 407 and step 409 in the method 400, and the processing unit 920 may be configured to perform step 408 in the method 400.

When the wireless communication apparatus 900 is configured to perform the method 500 in FIG. 5, the transceiver unit 910 may be configured to perform step 508 and step 510 in the method 500, and the processing unit 920 may be configured to perform step 509 in the method 500.

When the wireless communication apparatus 900 is configured to perform the method 600 in FIG. 6, the transceiver unit 910 may be configured to perform step 603, step 604, step 606, and step 608 in the method 600, and the processing unit 920 may be configured to perform step 607 in the method 600.

The processing unit 920 in the foregoing embodiments may be implemented by at least one processor or a processor-related circuit. The transceiver unit 910 may be implemented by using a transceiver or a transceiver-related circuit. The transceiver unit 910 may also be referred to as a communication unit or a communication interface. The storage unit may be implemented by using at least one memory.

Figure 10:
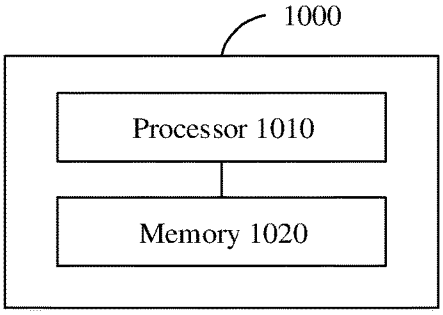
FIG. 10 is a schematic diagram of an architecture applicable to a wireless communication apparatus according to an embodiment of this application.

As shown in FIG. 10, an embodiment of this application further provides a wireless communication apparatus 1000. The wireless communication apparatus 1000 includes a processor 1010. The processor 1010 is coupled to a memory 1020. The memory 1020 is configured to store a computer program or instructions and/or data. The processor 1010 is configured to execute the computer program or the instructions and/or the data stored in the memory 1020.

Optionally, the wireless communication apparatus 1000 includes one or more processors 1010.

Optionally, as shown in FIG. 10, the communication apparatus 1000 may further include the memory 1020.

Optionally, the wireless communication apparatus 1000 may include one or more memories 1020.

Optionally, the memory 1020 may be integrated with the processor 1010, or separately disposed.

In a solution, the wireless communication apparatus 1000 is configured to implement operations performed by the first device in the foregoing method embodiments.

For example, the processor 1010 is configured to implement a processing-related operation performed by the first device in the foregoing method embodiments.

In another solution, the wireless communication apparatus 1000 is configured to implement operations performed by the second device in the foregoing method embodiments.

For example, the processor 1010 is configured to implement a processing-related operation performed by the second device in the foregoing method embodiments.

It should be noted that the foregoing method embodiments of this application may be applied to a processor, or implemented by a processor. The processor may be an integrated circuit chip with a signal processing capability. In an implementation process, the steps in the foregoing method embodiments may be completed by an integrated logic circuit in a form of hardware or instructions in a form of software in the processor. The processor may be a general-purpose processor, a digital signal processor (DSP), an application specific integrated circuit (ASIC), a field programmable gate array (FPGA) or another programmable logic device, a discrete gate or a transistor logic device, or a discrete hardware component. The processor may implement or perform the methods, steps, and logical block diagrams that are disclosed in embodiments of this application. The general-purpose processor may be a microprocessor, or the processor may be any conventional processor or the like. Steps of the methods disclosed with reference to embodiments of this application may be directly performed and completed by a hardware decoding processor, or may be performed and completed by using a combination of hardware and software modules in a decoding processor. The software module may be located in a mature storage medium in the art such as a random access memory, a flash memory, a read-only memory, a programmable read-only memory, an electrically erasable programmable read-only memory, or a register. The storage medium is located in the memory. The processor reads information in the memory and completes the steps of the foregoing methods in combination with hardware of the processor.

It may be understood that, in embodiments of this application, the memory may be a volatile memory or a nonvolatile memory, or may include both a volatile memory and a non-volatile memory. The non-volatile memory may be a read-only memory (ROM), a programmable read-only memory (Programmable ROM, PROM), an erasable programmable read-only memory (Erasable PROM, EPROM), an electrically erasable programmable read-only memory (Electrically EPROM, EEPROM), or a flash memory. The volatile memory may be a random access memory (RAM), and is used as an external cache. By way of example but not limitative description, many forms of RAMs may be used, for example, a static random access memory (Static RAM, SRAM), a dynamic random access memory (Dynamic RAM, DRAM), a synchronous dynamic random access memory (Synchronous DRAM, SDRAM), a double data rate synchronous dynamic random access memory (Double Data Rate SDRAM, DDR SDRAM), an enhanced synchronous dynamic random access memory (Enhanced SDRAM, ESDRAM), a synchlink dynamic random access memory (Synchlink DRAM, SLDRAM), and a direct rambus random access memory (Direct Rambus RAM, DR RAM). It should be noted that the memory of the systems and methods described in this specification includes but is not limited to these and any other proper types of memories.

It should be understood that the term "and/or" in this specification describes only an association relationship between associated objects and indicates that three relationships may exist. For example, A and/or B may represent the following three cases: Only A exists, both A and B exist, and only B exists. In addition, the character "/" in this specification generally indicates an "or" relationship between the associated objects.

It should be understood that, in embodiments of this application, sequence numbers of the foregoing processes do not mean execution sequences. The execution sequences of the processes should be determined based on functions and internal logic of the processes, and should not constitute any limitation on implementation processes of embodiments of this application.

A person of ordinary skill in the art may be aware that, in combination with the examples described in embodiments disclosed in this specification, units and algorithm steps may be implemented by electronic hardware or a combination of computer software and electronic hardware. Whether the functions are performed by hardware or software depends on particular applications and design constraints of the technical solutions. A person skilled in the art may use different methods to implement the described functions for each particular application, but it should not be considered that the implementation goes beyond the scope of this application.

It may be clearly understood by a person skilled in the art that, for the purpose of convenient and brief description, for a detailed working process of the foregoing system, apparatus, and unit, reference may be made to a corresponding process in the foregoing method embodiments, and details are not described herein again.

In the several embodiments provided in this application, it should be understood that the disclosed system, apparatus and method may be implemented in other manners. For example, the described apparatus embodiments are merely examples. For example, division of the units is merely logical function division. During actual implementation, another division manner may be used. For example, a plurality of units or components may be combined or integrated into another system, or some features may be ignored or not be performed. In addition, the mutual coupling or direct coupling or communication connection shown or discussed may be indirect coupling or communication connection through some interfaces, apparatuses, or units, and may be in electrical, mechanical, or other forms.

The units described as separate parts may or may not be physically separate, and parts displayed as units may or may not be physical units, may be located in one place, or may be distributed on a plurality of network units. Some or all of the units may be selected based on actual requirements to achieve the objectives of the solutions of embodiments.

In addition, functional units in embodiments of this application may be integrated into one processing unit, each of the units may exist alone physically, or two or more units are integrated into one unit.

When the function is implemented in a form of a software functional unit and sold or used as an independent product, the function may be stored in a computer-readable storage medium. Based on such an understanding, the technical solutions in this application essentially, or the part contributing to the conventional technology, or some of the technical solutions may be implemented in a form of a software product. A computer software product is stored in a storage medium, and includes several instructions for instructing a computer device (which may be a personal computer, a server, a network device, or the like) to perform all or some of the steps of the methods described in embodiments of this application. The storage medium includes any medium that can store program code, such as a USB flash drive, a removable hard disk, a read-only memory (ROM), a random access memory (RAM), a magnetic disk, or an optical disc.

The foregoing descriptions are merely specific implementations of this application, but the protection scope of this application is not limited thereto. Any variation or replacement readily figured out by a person skilled in the art within the technical scope disclosed in this application shall fall within the protection scope of this application. Therefore, the protection scope of this application shall be subject to the protection scope of the claims.

What is claimed is:

1. A wireless communication method, comprising:

obtaining, by a first device, first information, wherein the first information comprises a correspondence between first customer premise equipment and at least one first terminal device, and a correspondence between the first terminal device and at least one second terminal device; and configuring, by the first device, the first information on a second device, wherein the first information is used by the second device to verify that a received service packet is a service packet sent by the first terminal device to the second terminal device by using the first customer premise equipment, wherein the first information further comprises a security certificate of the first terminal device, the security certificate is used by the second device to verify an identifier signature of the first terminal device based on a public key of the first terminal device, and the security certificate is delivered or pre-configured by the first device.

2. The method according to claim 1, wherein the method further comprises:

generating, by the first device, a token of the first customer premise equipment based on the first information, and signing the token; and sending, by the first device, the token to the second device.

3. The method according to claim 1, wherein the method further comprises:

generating, by the first device, a configuration message of the first customer premise equipment based on the first information; and sending, by the first device, the configuration message to the second device.

4. The method according to claim 1, wherein the configuring, by the first device, the first information on a second device comprises:

sending, by the first device, the first information to the second device by using a user plane function (UPF) network element.

5. The method according to claim 4, wherein the first device is an application function AF, the second device is one of the UPF, the first customer premise equipment, or second customer premise equipment that is customer premise equipment corresponding to the at least one second terminal device.

6. The method according to claim 1, wherein the configuring, by the first device, the first information on a second device comprises:

sending, by the first device, the first information to a network exposure function (NEF) network element, so that the NEF network element sends a configuration request message to the second device by using a unified data management (UDM) network element, wherein the configuration request message is used to request the second device to configure the first information, and the configuration request message comprises a subscription permanent identifier of the second device; or sending, by the first device, a policy request message to a policy control function (PCF) network element, wherein the policy request message comprises the first information, and the policy request message is used by the PCF network element to send a packet detection rule (PDR) and a QoS enforcement rule (QER) to a user plane function (UPF) network element by using a session management function (SMF) network element.

7. The method according to claim 1, wherein the first information further comprises that the first terminal device is a control end device and/or the second terminal device is an execution end device.

8. A wireless communication method, comprising:

obtaining, by a second device, first information, wherein the first information comprises a correspondence between first customer premise equipment and at least one first terminal device, and a correspondence between the first terminal device and at least one second terminal device;

verifying, by the second device based on the first information, that a received service packet is a service packet sent by the first terminal device to the second terminal device by using the first customer premise equipment; and sending, by the second device, the service packet to second customer premise equipment, wherein the first information further comprises a security certificate of the first terminal device, and the method further comprises:

verifying, by the second device, an identifier signature of the first terminal device based on a public key of the first terminal device.

9. The method according to claim 8, wherein the obtaining, by a second device, first information comprises:

receiving, by the second device, a token, wherein the token is generated by a first device for the first customer premise equipment based on the first information.

10. The method according to claim 9, wherein the method further comprises:

verifying, by the second device, the token based on a signature of the token; and verifying, by the second device based on the token and an identifier of the first customer premise equipment, that the token is the token corresponding to the first customer premise equipment.

11. The method according to claim 8, wherein the obtaining, by a second device, first information comprises:

receiving, by the second device, a configuration message, wherein the configuration message is generated by a first device for the first customer premise equipment based on the first information.

12. The method according to claim 8, wherein the verifying, by the second device based on the first information, that a received service packet is a service packet sent by the first terminal device to the second terminal device by using the first customer premise equipment comprises:

verifying, by the second device based on the correspondence between the first customer premise equipment and the at least one first terminal device in the first information, that a control end device corresponding to a source address of the service packet is one of the first terminal device corresponding to the first customer premise equipment; and verifying, by the second device based on the correspondence between the first terminal device and the at least one second terminal device in the first information, that the control end device and an execution end device that correspond to the source address and a destination address of the service packet are respectively one of the first terminal device and one of the second terminal device.

13. The method according to claim 12, wherein the second device verifies, based on the first information, that the received service packet is the service packet sent by the first terminal device to the second terminal device by using the first customer premise equipment, and the method further comprises:

verifying, by the second device, an identifier signature of the first customer premise equipment based on a public key of the first customer premise equipment.

14. The method according to claim 8, wherein the obtaining, by a second device, first information comprises:

obtaining, by the second device, the first information by using a user plane function (UPF) network element.

15. The method according to claim 14, wherein a first device is an application function (AF), the second device is one of the UPF, the first customer premise equipment, or second customer premise equipment that is customer premise equipment corresponding to the at least one second terminal device.

16. The method according to claim 8, wherein the obtaining, by a second device, first information comprises:

receiving, by the second device, a configuration request message from a unified data management (UDM) network element, wherein the configuration request message is generated by the UDM network element based on the first information, and the configuration request message comprises a subscription permanent identifier of the second device; or receiving, by the second device, a packet detection rule (PDR) and a QoS enforcement rule (QER) from a session management function (SMF) network element, wherein the PDR and the QER are generated by a policy control function (PCF) network element by requesting the SMF network element by using a policy request message, and the policy request message comprises the first information.

17. The method according to claim 8, wherein the first information further comprises that the first terminal device is a control end device and/or the second terminal device is an execution end device.

18. A wireless communication apparatus as a first device, comprising:

a memory, configured to store computer instructions; and a processor, configured to execute the computer instructions stored in the memory, to enable the wireless communication apparatus to:

obtain, first information, wherein the first information comprises a correspondence between first customer premise equipment and at least one first terminal device, and a correspondence between the at least one first terminal device and at least one second terminal device; and configure, the first information on a second device, wherein the first information is used by the second device to verify that a received service packet is a service packet sent by the first terminal device to the second terminal device by using the first customer premise equipment, wherein the first information further comprises a security certificate of the first terminal device, the security certificate is used by the second device to verify an identifier signature of the first terminal device based on a public key of the first terminal device, and the security certificate is delivered or pre-configured by the first device.

19. The wireless communication apparatus according to claim 18, wherein the computer instructions further enable the wireless communication apparatus to:

generate a token of the first customer premise equipment based on the first information, and signing the token; and send the token to the second device.

20. The wireless communication apparatus according to claim 18, wherein the computer instructions further enable the wireless communication apparatus to:

generate a configuration message of the first customer premise equipment based on the first information; and send the configuration message to the second device.

* * * * *